United States Patent [19]

Aylsworth et al.

[11] Patent Number: 5,746,806
[45] Date of Patent: May 5, 1998

[54] APPARATUS AND METHOD FOR CONTROLLING OUTPUT OF AN OXYGEN CONCENTRATOR

[75] Inventors: Alonzo C. Aylsworth, St. Louis; Kyle Adriance, St. Charles; Gregory R. Miller, St. Louis, all of Mo.

[73] Assignee: Nellcor Puritan Bennett Incorporated, St. Charles, Mo.; a part interest

[21] Appl. No.: 698,062

[22] Filed: Aug. 15, 1996

[51] Int. Cl.⁶ .................................................. B01D 53/047
[52] U.S. Cl. .......................... 95/8; 95/12; 95/54; 95/96; 95/130; 96/4; 96/111; 96/130; 55/210; 55/270
[58] Field of Search ..................... 55/210, 218, 270; 95/8, 12, 23, 45, 47, 54, 96, 130; 96/4, 111, 116, 130

[56] References Cited

U.S. PATENT DOCUMENTS

| | | | |
|---|---|---|---|
| 3,550,355 | 12/1970 | Remus et al. | 95/54 |
| 3,930,814 | 1/1976 | Gessner | 95/54 X |
| 4,323,370 | 4/1982 | Leitgeb | 95/23 |
| 4,421,529 | 12/1983 | Revak et al. | 95/54 |
| 4,502,873 | 3/1985 | Mottram et al. | 96/116 |
| 4,627,860 | 12/1986 | Rowland | 96/111 |
| 4,648,888 | 3/1987 | Rowland | 95/8 |
| 4,687,013 | 8/1987 | Stevenson | 96/111 X |
| 4,806,132 | 2/1989 | Campbell | 95/54 X |
| 4,822,384 | 4/1989 | Kato et al. | 96/130 X |
| 4,844,059 | 7/1989 | Koch | 96/116 X |
| 5,053,058 | 10/1991 | Mitariten | 96/4 X |
| 5,071,453 | 12/1991 | Hradek et al. | 96/111 |
| 5,266,101 | 11/1993 | Barbe et al. | 95/47 X |
| 5,281,253 | 1/1994 | Thompson | 95/23 X |
| 5,439,507 | 8/1995 | Barber et al. | 95/47 X |
| 5,470,379 | 11/1995 | Garrett | 95/54 X |
| 5,474,595 | 12/1995 | McCombs | 95/96 X |
| 5,496,388 | 3/1996 | Tellier | 96/4 X |
| 5,529,607 | 6/1996 | Tan | 95/12 |
| 5,531,807 | 7/1996 | McCombs | 95/130 X |
| 5,593,478 | 1/1997 | Hill et al. | 96/111 X |

FOREIGN PATENT DOCUMENTS

| | | | |
|---|---|---|---|
| 57-071804 | 5/1982 | Japan | 95/12 |
| 59-055390 | 3/1984 | Japan | 95/8 |
| 60-011206 | 1/1985 | Japan | 96/4 |
| 1-007001 | 2/1989 | Japan | 95/12 |
| 6-277433 | 10/1994 | Japan | 95/23 |

*Primary Examiner*—Robert Spitzer
*Attorney, Agent, or Firm*—Paul M. Denk

[57] ABSTRACT

An apparatus and method for controlling the output of an oxygen concentrator wherein an oxygen concentrator indicator is comprised of an oxygen sensor monitor and circuit board which receives a gas sample from the concentrator, the oxygen concentrator indicator circuit board converts the concentration of oxygen to a DC voltage range from 0 to 1 volt corresponding to 0% to 100% oxygen. A plurality of set-point amplifiers accept the voltage and feed the voltage to a logic block where the voltage is analyzed to insure that only one of a plurality of solid state relays or switches is energized at a time. A plurality of taps on an AC motor winding are selectively energized by the solid state relays to drive the oxygen concentrator at a pre-determined rate in response to the concentration of oxygen generated by the concentrator. In addition, where other types of motors are employed, such as a linear motor, similar type controls may be provided for regulating the actuation of the linear motor for generating reciprocal motion for operations of the oxygen concentrator.

36 Claims, 8 Drawing Sheets

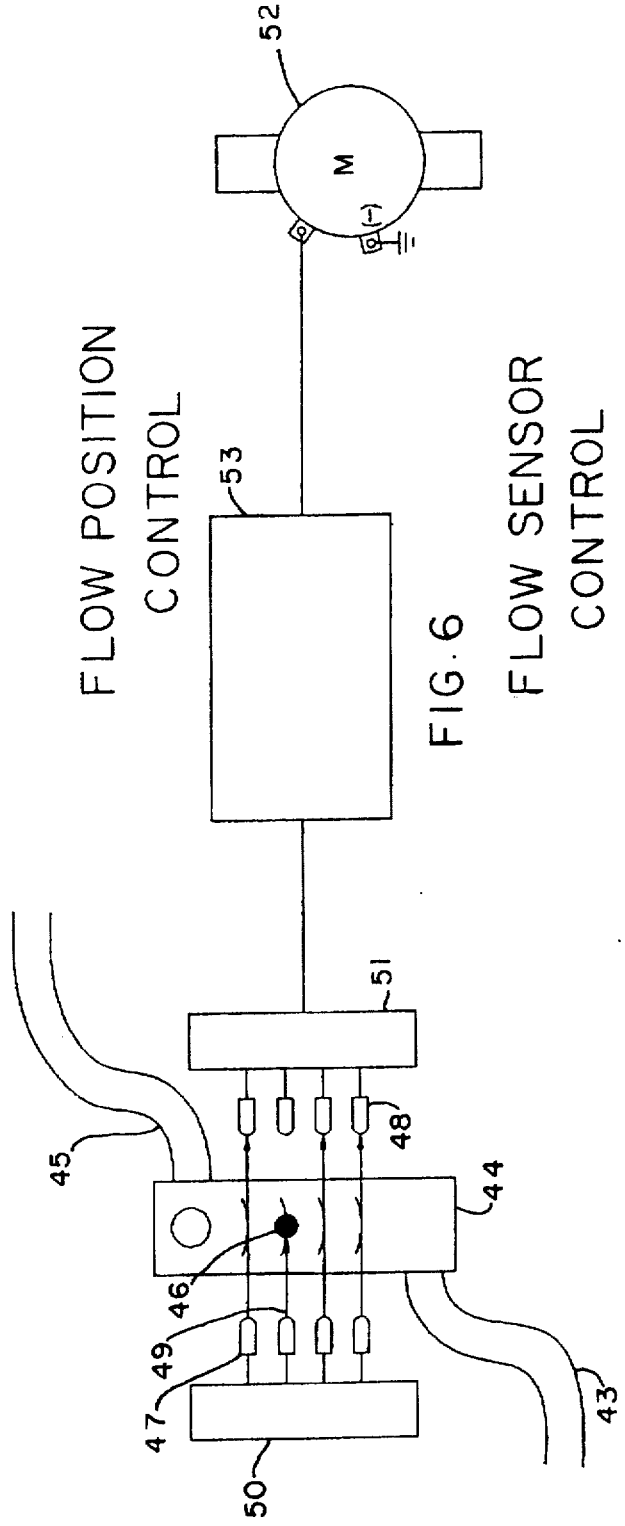
FIG. 6 FLOW POSITION CONTROL
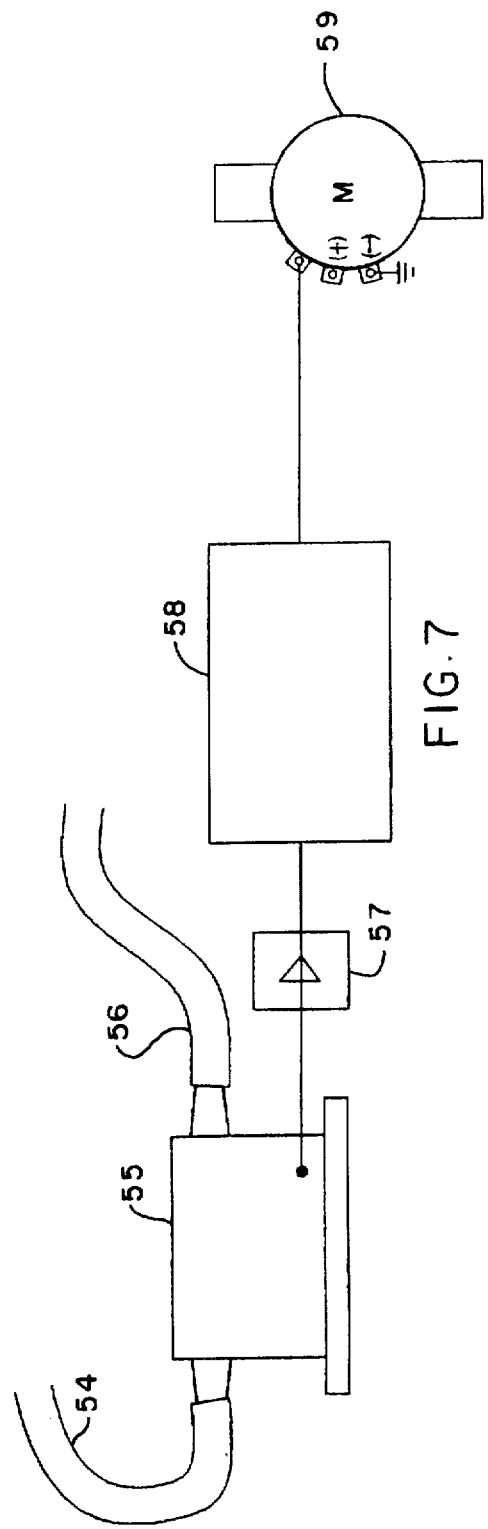
FIG. 7 FLOW SENSOR CONTROL

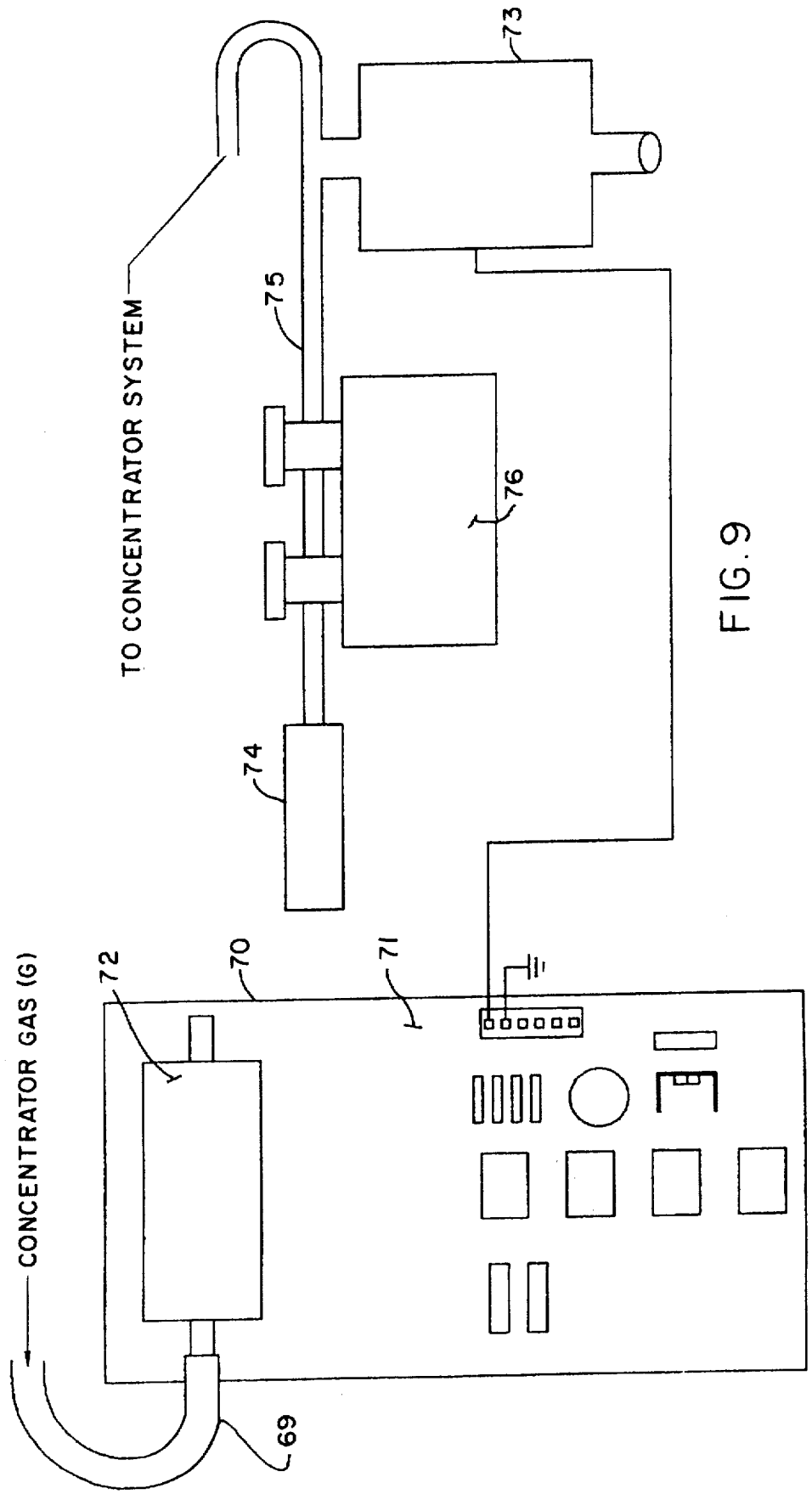

APPARATUS AND METHOD FOR CONTROLLING OUTPUT OF AN OXYGEN CONCENTRATOR

BACKGROUND OF THE INVENTION

This invention relates to an apparatus for controlling the concentration of oxygen from an oxygen generator and the method of using the same, more specifically to a positive feed-back apparatus for controlling an AC or other type motor driven oxygen concentrator based upon the concentration of oxygen in gas generated by the concentrator.

Oxygen concentrators are well-known in the art. Oxygen concentrators are used in medical practice to generate oxygen enriched air for patients with chronic respiratory disease or other health problems. Prior to the development of oxygen concentrators, patients were required to breath from oxygen masks or nasal cannulae attached to gas bottles containing compressed or liquid oxygen. Oxygen concentrators are generally smaller, portable and more cost-effective and provide a desirable alternative to bulk oxygen tanks for patients who do not require pure oxygen but who can function well with oxygen enriched air.

Generally speaking, an oxygen concentrator is comprised of a molecular sieve that absorbs unwanted gases, such as nitrogen, out of compressed atmospheric air resulting in an oxygen-rich air for breathing purposes. Various methods and devices for concentrating oxygen or fractionating gases have been disclosed, for example, in U.S. Pat. No. 4,545,790 to Miller et al., U.S. Pat. No. 4,449,990 to Tedford, Jr. and U.S. Pat. No. 4,440,548 to Hill.

In conventional oxygen concentrators, the amount or concentration of oxygen generated is dependent upon the amount of compressed atmospheric air provided to the molecular sieve in the generator. Generally, a motor-driven compressor draws ambient air into the generator, increasing the pressure level of the ambient air to a supra-atmospheric pressure level. The supra-atmospheric air is directed to the molecular sieve where the unwanted gases are adsorbed by an adsorbent, for example, zeolite or other appropriate adsorbent. The unwanted gases are adsorbed thereby increasing the concentration of oxygen. This reaction is rate dependent; the more concentrated (supra-atmospheric) ambient air introduced to the molecular sieve, the greater the concentration of oxygen generated by the oxygen concentrator at a given rate of flow of oxygen enriched output. For purposes of clarity, the present invention will be described as applied to the zeolite-based method of oxygen generation. However, the present invention has application in other technologies, including hollow fiber, membrane, electrolysis, and ceramic-based technologies.

Heretofore, the concentration of oxygen generated by prior art concentrators was pre-set and did not vary depending upon demand. For example, a predetermined oxygen concentration and volume was generated regardless of the oxygen requirement of the patient. However, this method is inflexible and does not respond to changes in oxygen concentration in the oxygen-rich air that is generated. Moreover, if the adsorbent, such as zeolite, becomes saturated, the concentration of oxygen in the generated oxygen enriched air may decrease. In the prior art oxygen concentrators, there is no feed-back mechanism to test the concentration of oxygen enriched air that leaves the generator and drive the oxygen concentrator to produce more supra-atmospheric air so as to produce a higher concentration of oxygen in the generated oxygen enriched air. Thus, the patient or user of the oxygen generator will receive air with a decreased oxygen concentration.

These prior art concentrators have to run constantly at a preselected rate of speed generating heat and noise which leads to premature equipment failure. Additionally, when a patient who requires a common prescription of, for example, two liters of oxygen per minute uses a concentrator that produces up to five liters per minute, an inefficiency results since the concentrator is operating at a rate that will produce five liters per minute. There are increased operating costs that usually are borne by the patient.

It is, therefore, desirable to have an oxygen concentrator that generates an oxygen enriched air that can respond to the actual concentration of oxygen generated using a gas measuring device that can detect the concentration of oxygen in a sample and then, through a feed-back mechanism, adjust the rate of operation to accommodate changes in the oxygen concentration.

OBJECT OF THE PRESENT INVENTION

It is a principal object of the present invention to provide an apparatus that can control the percentage of oxygen emitted from an oxygen concentrator through a feed-back mechanism that adjusts for the concentration of oxygen detected in a sample of the generated oxygen enriched air.

Another object of the invention is to provide a method of controlling the percentage of oxygen generated by an oxygen concentrator in response to the concentration actually generated so that the concentrator runs at optimum efficiency with less heat and noise.

Still another object of the present invention is to provide an apparatus for controlling the percentage of oxygen generated by an oxygen concentrator utilizing a gas analyzer and a feed-back mechanism for controlling the speed of the concentrator motor so as to control the amount of supra-atmospheric air exposed to the molecular sieve in response to the concentration of oxygen in a sample.

Another object of the invention is to provide a control mechanism for an oxygen concentrator which provides for precise control of the amount of oxygen generated by the concentrator during domestic use so that a home-bound patient can be assured that the precise quantity of oxygen is being generated.

Yet another object of the present invention is to provide a means for efficiently controlling an oxygen concentrator to provide the required amount of oxygen to the patient at all times.

Still another object of the invention is to provide means for efficiently controlling an oxygen concentrator so that the mechanical components within the concentrator are subjected to minimum heat and mechanical wear.

Yet a further object of this invention is to provide means for controlling the actuation and operations of a motor means, such as a linear motor means, in its functioning of an oxygen concentrator to provide a high percentage of generated oxygen.

Briefly stated, an apparatus and method of using the same is provided for controlling the output of an oxygen concentrator wherein an oxygen concentrator indicator (O.C.I.) comprised of an oxygen sensor monitor and a circuit board receives a continuous sample or periodic sample of concentrator oxygen-enriched gas. The output of the O.C.I. is converted to an electrical output level (i.e. 0 to 1 volt DC) corresponding to 0% to 100% oxygen or other oxygen range as may be appropriate for the application. The voltage is fed to a plurality of set point amplifiers corresponding to preset oxygen concentrations. The set-point amplifier outputs are analyzed by a logic block to ensure that only one of a plurality of solid state relays is energized at any one time. The logic block also contains time delays to accommodate small fluctuations in the concentration of the sample gas levels. The solid state relays in turn selectively energize appropriate taps on the oxygen concentrator AC motor winding, the appropriate r.p.m. tap being selected in direct relationship to the percentage of oxygen in the sample from the concentrator.

In other embodiments, the electrical output may create a digital signal, an analog signal or digital output to provide a feedback mechanism. The feedback mechanism is used to control the oxygen concentrator by adjusting the rate of operation of the motor, the compressor, the vacuum valve or bleed valve to accommodate changes in the oxygen concentration and/or oxygen enriched output. The feedback mechanisms of the present invention also can be used to control the speed and output of the motor cooling fan or concentrator ventilating fan to prevent premature wear of the device.

BRIEF DESCRIPTION OF THE DRAWINGS

FIG. 6 is a partial schematic, partial diagrammatic view of the apparatus and method of the present invention employing flow position control means for controlling the operation of an oxygen concentrator;

FIG. 7 is a partial schematic, partial diagrammatic view of the apparatus and method of the present invention employing flow sensor control means for controlling the operation of an oxygen concentrator;

FIG. 9 is a partial schematic, partial diagrammatic view of the apparatus and method of the present invention using bleed air control means for controlling the operation of an oxygen concentrator.

DESCRIPTION OF THE PREFERRED EMBODIMENT

Figure 1:
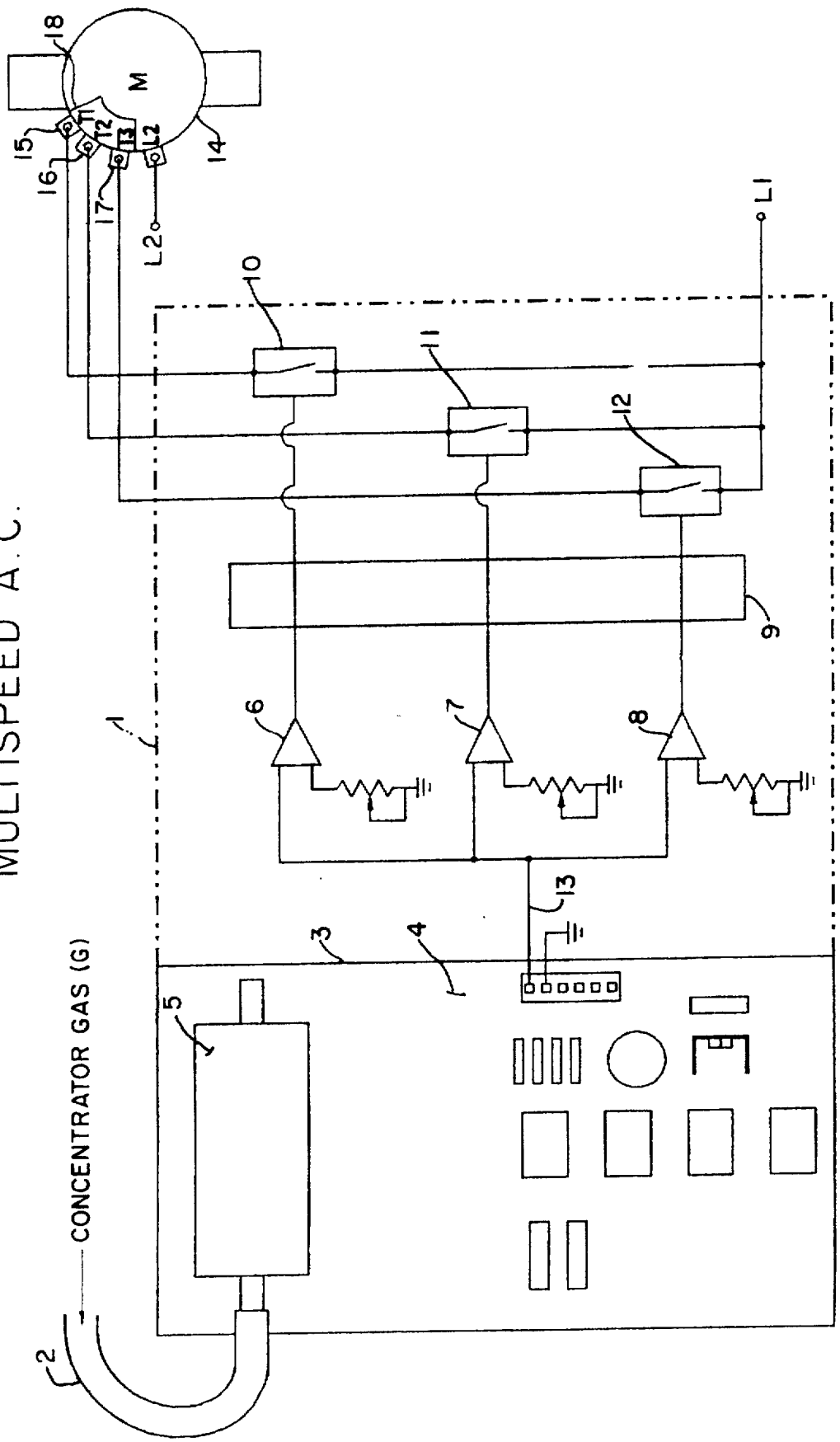
FIG. 1 is a partial schematic, partial diagrammatic view of the apparatus and method of the present invention employing multispeed A.C. means for controlling the operation of an oxygen concentrator.

The apparatus for controlling the concentration of oxygen from an oxygen concentrator using multispeed A.C. means is shown generally schematically and diagrammatically as reference numeral 1 in FIG. 1.

A gas sample inlet port 2 consisting of a tube or fitting or other appropriate means is operatively connected to and leads from an oxygen concentrator unit (not shown). A sample of the gas G generated by the concentrator flows into device 1 comprised of an oxygen concentration indicator 3, a conventional pre-printed circuit board 4 and oxygen sensor 5.

The oxygen sensor 5 is an ultrasonic gas measuring device of the type as described in U.S. Pat. No. 5,060,514, which is owned by the common assignee of this application, the disclosure of which is herein incorporated by reference. Printed circuit board 4 integrates the oxygen content of sample G as determined by sensor 5 and converts the concentration to an electrical output ranging from 0 to 1 volt DC which corresponds to 0 to 100 percent oxygen. The type of circuitry provided upon the board 4 as used in conjunction with the sensor 5 will be similar if not very related to the type of circuitry utilized to provide functionality to the gas measuring device as explained in said United States patent.

Oxygen concentration indicator 3 is electronically connected to a plurality of set point amplifiers, shown as amplifier 6, 7, and 8 in FIG. 1. The set-point amplifiers are voltage comparators, for example, those available from National Semiconductor (#LM393). Although the preferred embodiment employs three such set-point amplifiers, it should be noted that any number greater than one may be used. There is also a preprogrammed logic block 9. Set-point amplifiers 6 to 8 three relays 10, 11 and 12. Although three relays are employed in the preferred embodiment, it should be noted that there may be any number greater than one corresponding to the number of set-point amplifiers employed. The relays may be mechanical relays, for example, those commonly available from Aromat (#JR1aF-DC24V) or various electronic switching means commonly available, such as solid state switching relays from Crydom, Corp. Relays 10 through 12 are electronically connectd to a custom AC motor 14, at various positions of its windings, disposed within the concentrator and electronically energized through lead 13 so as to drive the concentrator to increase or decrease the amount of supra-atmospheric air supplied to the molecular sieve within the concentrator. These relays 10 through 12 can also comprise transistors, or MOSFETS, which are available from Motorola Corporation, of Austin, Tex. The transistors may be what are identified as an IBGT Model No. IRGBC205, and may also be obtained from International Rectifier Corporation. Additionally, standard bipolar transistors such as Model No. BUL147F may also be obtained from said Motorola Corporation. Furthermore, these relays may be solid state relays, as available in the art. A typical electric motor and associated compressor are commercially available from Gast Mfg. (#OX2XM2202). It is just as likely that instead of controlling the operations of a motor, such as identified at 14, that the electrically energized components, such as the identified relays, that are regulated as a result of the charge conducted through the lead 13, from the measuring device, could be used to control the stroke of a linear style motor, so as to increase or decrease concentrator's output, and thereby regulate the quantity of oxygen being generated through the compressor, associated with such a motor, in addition to the quality or purity of oxygen generated. Such a linear motor, for use for operating linear compressor, is shown and described in the United States patent application entitled "Fluid Bearing With Compliant Linkage for Centering Reciprocating Bodies," Ser. No. 08/214,984, filed on Mar. 21, 1994, now U.S. Pat. No. 5,525,845, and the subject matter of such application is incorporated herein by reference. The degree of charge conducted over the circuit line 13, from the gas measuring device 3, can be used to control and regulate the stroke of the linear motor in its providing functioning to the compressor of the oxygen concentrator.

Each of the relays 10 to 12 is operatively connected to one of a plurality of conventional taps 15, 16 and 17 on the winding 18 of motor 14. The taps T1, T2 and T3, correspond to the conventional taps 15, 16 and 17, respectively, while the tap L2 electrically connects to the opposite end of the motor winding.

In operation, a sample of gas G enters into port 2 and is analyzed by sensor 5 of the oxygen concentration indicator 3. Pre-printed circuitry board 4 converts the concentration of oxygen as detected by sensor 5 to a voltage ranging from 0 to 1 volt DC corresponding to 0 to 100 percent oxygen in the sample. This voltage is fed to the set-point amplifiers 6 to 8 which are pre-adjusted to respond to various predetermined oxygen concentrations. For example, when the oxygen concentration of sample G drops below a predetermined level, for example, 80% oxygen, motor 14 would be energized for maximum revolutions per minute (r.p.m.'s) and thereby boost the concentration of oxygen generated by the concentrator. And, for example, amplifier 8 could be set to maintain a minimal rate of r.p.m.'s to provide a minimal output from motor 14 if the detected oxygen concentration exceeds a high range, for example, something equal to or greater than 90%. The r.p.m. selection of motor 14 is achieved by taps 15, 16 and 17 on motor winding 18, which is common to the art.

Pre-programmed logic block 9 functions to analyze the output from the set point amplifiers 6 to 8 before that output is fed to relays 10 to 12 so as to insure that only one of the solid state relays is energized at any given time, thus preventing a potential problem that would result if two or more relays were energized at the same time. Logic block 9 may also contain time delays in order to accommodate some small fluctuations in the oxygen concentration in sample G that do not warrant a change in the oxygen concentration and thus do not warrant a change in the speed of motor 14. The logic block 9 consists of CMOS technology integrated circuits commonly available from National Semiconductor, such as #CD4001 and timer integrated circuits also commonly available from National Semiconductor. More specifically, the logic block 9 includes a series of standard logic gates, and is available from National Semiconductor, or such a logic block can be obtained from Motorola Corporation, of Austin, Tex., under Model No. MC14000 Series.

Relays 10 to 12 energize the individual taps 15 to 17 by stepping up the low voltage outputs from logic block 9 to the AC motor, or linear motor, to higher voltage requirements.

There is a continuous monitoring by oxygen concentration indicator 3 of sampling of gas mixture generated by the oxygen concentrator. The combination of the set-point amplifiers 6 to 8, logic block 9, relays 10 to 12, and connected taps 15 to 17 on the motor winding 18, combine to adjust the speed of motor 14 in response to the concentration of oxygen in sample G. Therefore, there is an adjustment mechanism to keep the oxygen-rich air at a near constant desired concentration for the user.

Those skilled in the art will recognize that modifications of the present invention can be made within the scope of the invention. For example, although the invention has three set point amplifiers and three solid state relays and three rpm taps employed in the preferred embodiment, there may be a greater number or lesser number of set point amplifiers and corresponding relays and taps which would allow for wider variation in the incremental changes in the motor r.p.m.'s. For example, a greater number of set point amplifiers and corresponding relays and taps would allow for smaller incremental increases in motor r.p.m.'s.

Figure 2:
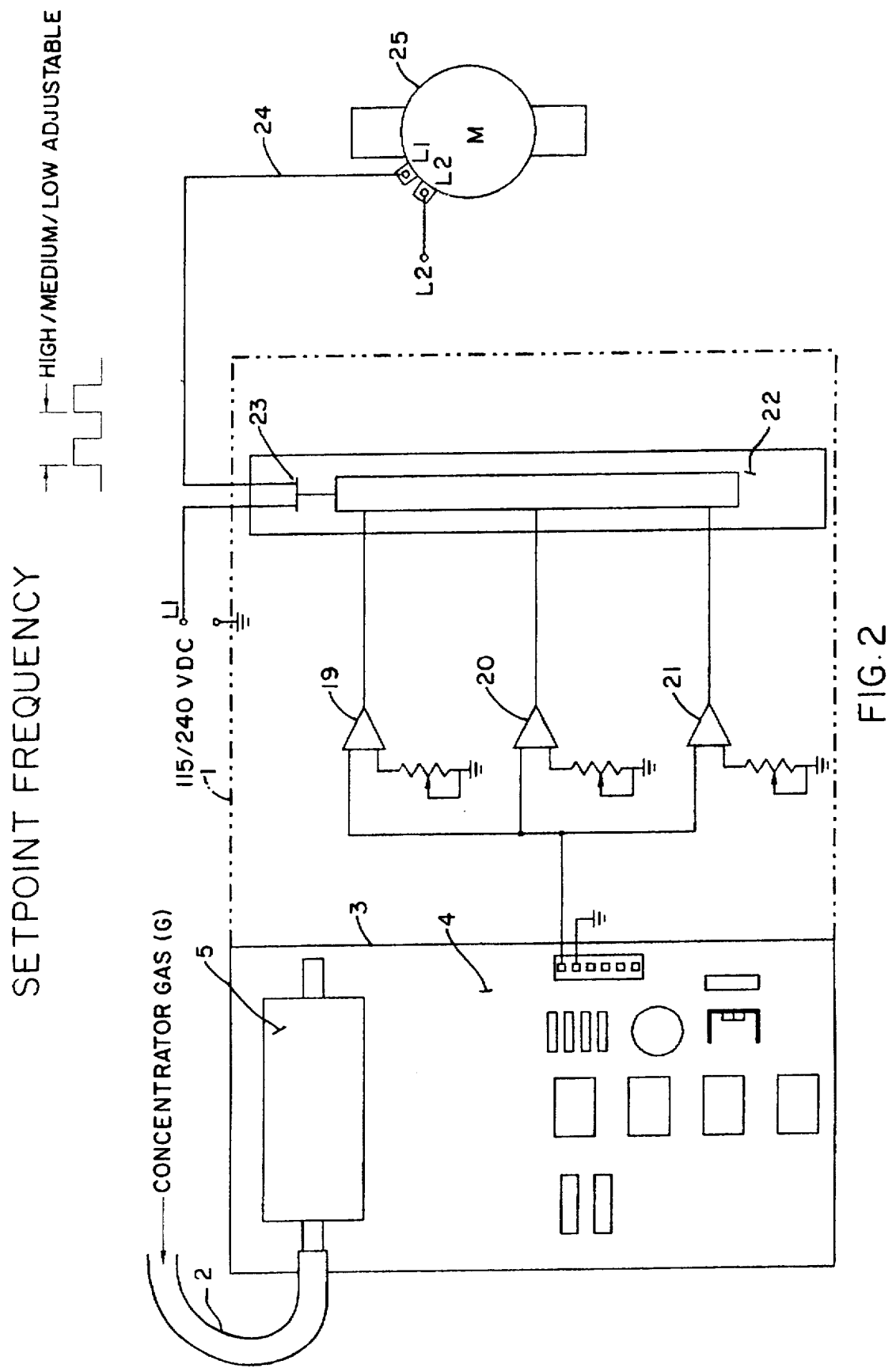
FIG. 2 is a partial schematic, partial diagrammatic view of the apparatus and method of the present invention employing set-point frequency means for controlling the operation of an oxygen concentrator.

The apparatus for controlling the concentration of oxygen from an oxygen concentrator using set-point frequency means is shown generally schematically and diagrammatically as reference numeral 1 in FIG. 2.

A gas sample inlet port 2 consisting of a tube or fitting or other appropriate means is operatively connected to and leads from an oxygen concentrator, flows into device 1 and is shown generally at 3 which is comprised of a conventional pre-printed circuit board 4 and an oxygen sensor 5. The oxygen concentration indicator assembly is available from Nellcor Puritan Bennett Corp., Serial No. 492744.

The oxygen sensor 5 is an ultrasonic gas measuring device of the type as described in U.S. Pat. No. 5,060,514, which is owned by a common assignee of this application, the disclosure of which is herein incorporated by reference. Printed circuit board 4 integrates the oxygen content of sample G as determined by sensor 5 and converts the concentration to an electrical output ranging from 0 to 1 volt D.C. which corresponds to 0 to 100 percent oxygen.

Oxygen concentration indicator 3 is electronically connected to three set-point amplifiers, shown as amplifier 19, 20 and 21 in FIG. 2. The set-point amplifiers are voltage comparators available from National Semiconductor, #LM393. Although the preferred embodiment employs three such set-point amplifiers, it should be noted that any number greater than one may be used. Set-point amplifiers 19, 20 and 21 are electronically connected to a set-point frequency generator 22. Although three frequency set-points are employed in the preferred embodiment, it should be noted that there may be any number greater than one corresponding to the number of set-point amplifiers employed.

The set-point frequency generator 22 contains the pre-programmed logic block circuitry, the frequency control circuitry, and a MOSFET solid state switching device 23. This may also be a transistor, such as available from International Rectifier Corporation, under Model No. IBGT. This pre-programmed logic block circuitry functions to analyze the output from set-point amplifiers 19, 20 and 21, so as to ensure that only one frequency is output from the set-point frequency generator 22 at any given time, thus preventing potential problems that would result if two or more frequency outputs were selected at the same time. The pre-programmed logic block may also contain time delays in order to accommodate some fluctuations in the oxygen concentration in sample G that do not warrant a change in the oxygen concentration and thus do not warrant a change in the speed of the motor 25. The pre-programmed logic block consists of CMOS technology integrated circuits commonly available from National Semiconductor such as, CC4001 and timer integrated circuits commonly available from National Semiconductor such as, LM555. In addition, the frequency generator 22, which acts in conjunction with the MOSFET 23, may also use a Motorola Corporation microprocessor with pulse modulated outputs, and process the charge conducted from the amplifiers 19, etc., that correspond to the speed desired for operations of the motor 25, or any linear style motor as used, in order to control their speed. The frequency generator 22 can also be obtained from a Company such as Motorola Corporation, under Model No. MC78HC11KA2. This frequency generator may also perform the logic block functions.

Additionally, the set-point frequency generator 22 contains pre-programmed frequency control circuitry. This circuitry functions to drive the MOSFET 23 at preprogrammed levels. The MOSFET 23 converts the low voltage drive signal to the high voltage that travels along wire 24 and through tap L1 to the winding of the motor 25. L2 represents the tap at the opposite end of the motor winding. The MOSFET 23 is commonly available from International Rectifier such as, #IRF830. It may be desirable in some applications to use a number of MOSFET's such as, IRF830, in a H-bridge configuration for more precise control. The motor 25 can be a commonly available inductive motor such as the motor attached to Thomas Industries compressor motor assembly #2619CE42-925. Or, it can be a linear style motor as previously described. The motor 25 operates such that the r.p.m. of the motor is a function of the frequency that the motor is driven at; for example, a low frequency yields a low r.p.m., or speed, and likewise a higher frequency would yield a higher r.p.m., or speed.

In operation, a sample of gas G enters into port 2 and is analyzed by sensor 5 of the oxygen concentration indicator 3. Pre-printed circuit board 4 converts the concentration of oxygen as detected by sensor 5 to a voltage ranging from 0 to 1 volt D.C. corresponding to 0 to 100 percent oxygen in the sample. This voltage is fed to the set-point amplifiers 19, 20 and 21 which are preadjusted to respond to various predetermined oxygen concentrations. For example, when the oxygen concentration of sample G drops below a predetermined level, for example, 90% oxygen, motor 25 would be energized for maximum revolutions per minute (r.p.m.'s) and thereby boost the concentration of oxygen generated by the concentrator. And, for example, amplifier 21 could be set to maintain a minimal rate of r.p.m.'s to provide a minimal output from motor 25 if the detected oxygen concentration exceeds a high range, for example, something equal to or greater than 90%. The r.p.m. selection of motor 25 is achieved by selecting frequencies that correpond to the predetermined r.p.m.'s.

There is a continuous monitoring by oxygen concentration indicator 3 of sampling of the gas mixture generated by the oxygen concentrator. The combination of the set-point amplifiers 19, 20 and 21, set-point frequency generator 22, MOSFET arrangement 23, and wire 24 combine to adjust the speed of motor 25 in response to the concentration of oxygen in sample G. Therefore, there is a mechanism to keep the oxygen enriched air at a near constant desired concentration for the user.

Those skilled in the art will recognize that modifications of the present invention as shown in FIG. 2 can be made within the scope of the invention. For example, although the invention has three set-point amplifiers and three r.p.m. set-points (output) employed in the preferred embodiment, there may be a greater number of set-point amplifiers and frequency outputs, which would allow for wider variation in the incremental changes in the motor r.p.m.'s. For example, a greater number of amplifiers and frequency outputs would allow for smaller incremental increases in the motor r.p.m.'s. It may be advantageous in some applications to use a two speed motor in lieu of a greater number of speeds which could result in lower cost, lower number of set-points, amplifiers, and frequency outputs.

Figure 3:
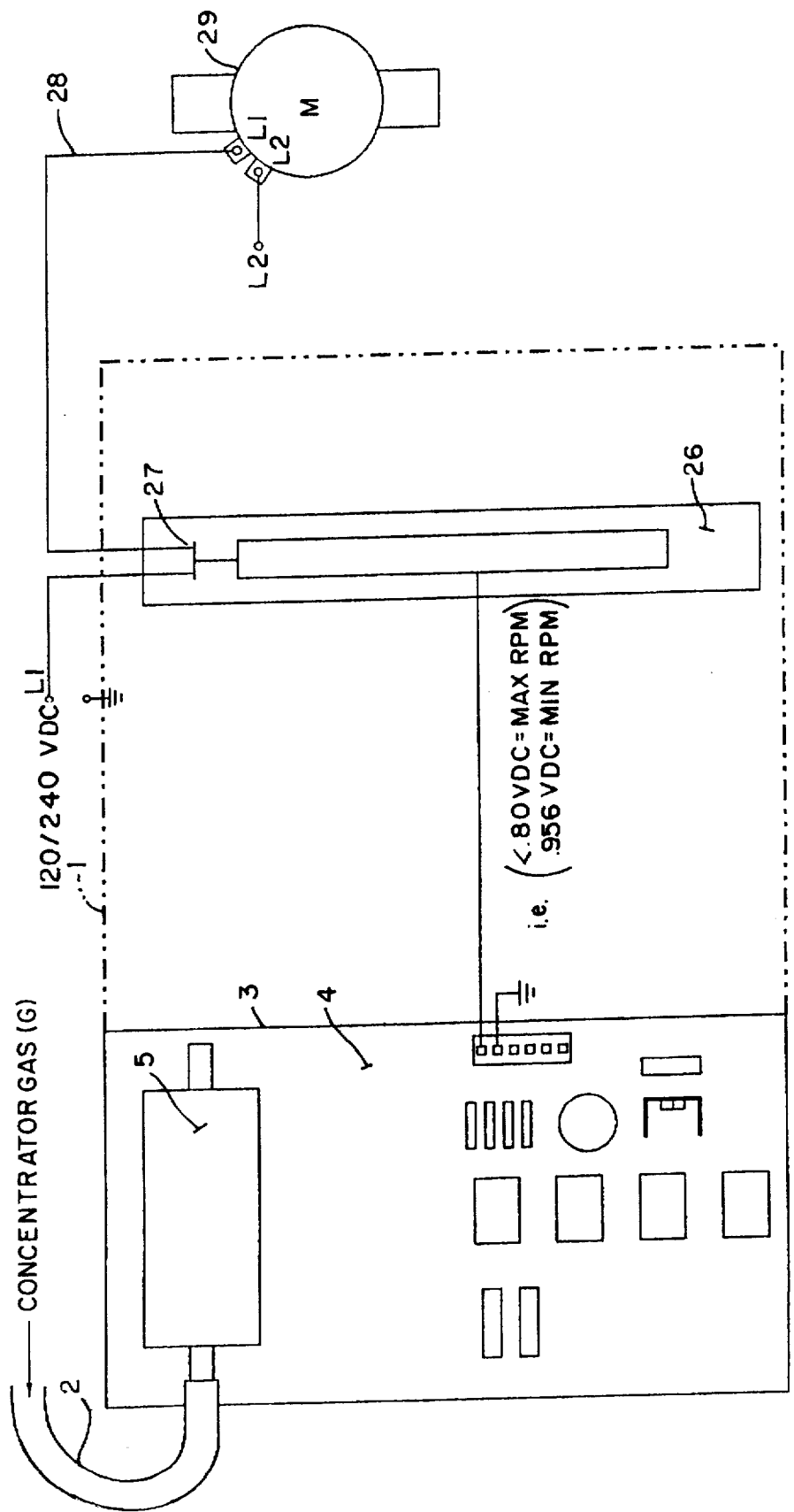
FIG. 3 is a partial schematic, partial diagrammatic view of the apparatus and method of the present invention employing variable frequency means for controlling the operation of an oxygen concentrator.

The apparatus for controlling the concentration of oxygen from an oxygen concentrator using variable frequency means is shown generally schematically and diagrammatically as reference numeral 1 in FIG. 3.

A gas sample inlet port 2 consisting of a tube or fitting or other appropriate means is operatively connected to and leads from an oxygen concentrator, flows into device 1 and is shown generally at 3 which is comprised of a conventional pre-printed circuit board 4 and an oxygen sensor 5, as aforesaid. The oxygen concentration indicator assembly is available from Nellcor Puritan Bennett Corp. #C-492744-66.

The oxygen sensor 5 is an ultrasonic gas measuring device of the type as described in U.S. Pat. No. 5,060,514, which is owned by the common assignee of this application, the disclosure of which is herein incorporated by reference. Printed circuit board 4 integrates the oxygen content of sample G as determined by sensor 5 and converts the concentration to an electrical output ranging from 0 to 1 volt D.C. which corresponds to 0 to 100 percent oxygen.

Oxygen concentration indicator 3 is electronically connected to the frequency generator 26 in FIG. 3. The frequency generator 26 contains the pre-programmed logic block circuitry, the frequency control circuitry, and a MOSFET solid state switching device 27, or a transistor may be utilized. The pre-programmed logic block circuitry functions to analyze the output from the oxygen concentration indicator 3. The pre-programmed logic block may also contain time delays in order to accommodate some small fluctuations in the oxygen concentration in sample G that do not warrant a change in the oxygen concentration and thus do not warrant a change in the speed of the motor 29. The pre-programmed logic block consists of CMOS technology integrated circuits commonly available from National Semiconductor such as, CD4001 and timer integrated circuits commonly available from National Semiconductor such as LM555. The input to the frequency generator 26, in this particular design, utilizes analog inputs to achieve processing of the output from the gas measuring device 5, through its circuit board 4, rather than utilizing digital inputs of the type regulating the set-point amplifiers 19 through 21, or 6 through 8, as previously described.

Additionally, the frequency generator 26 contains pre-programmed frequency control circuitry limiting the range of r.p.m.'s that can be derived by the oxygen concentration indicator 3 input. This circuitry functions to drive the MOSFET 27 over pre-programmed range. The MOSFET 27 converts the low voltage drive signal to the high voltage that travels along wire 28 to motor 29. The MOSFET 27 is commonly available from International Rectifier as, #IRF830. It may be desireable in some applications to use a number of MOSFET's such as, IRF830, in a H-bridge configuration for more precise control. The motor 29 can be a commonly available inductive motor such as the motor attached to Thomas Industries compressor motor assembly #2619CE42-925. The motor 29 operates such that the r.p.m. of the motor is a function of the frequency that the motor is driven at; for example, a low frequency yields a low r.p.m., or speed and likewise a higher frequency would yield a higher r.p.m. or speed.

In operations, a sample of gas G enters into port 2 and is analyzed by sensor 5 of the oxygen concentration indicator 3. Pre-printed circuit board 4 converts the concentration of oxygen as detected by sensor 5 to a voltage ranging from 0 to 1 volt D.C. corresponding to 0 to 100 percent oxygen in the sample. This voltage is fed to the frequency generator 26 which is preadjusted to respond to various predetermined oxygen concentrations. For example, when the oxygen concentration of sample G drops below a predetermined level, for example, 90% oxygen, motor 29 would be energized for maximum revolutions per minute (r.p.m.'s) and thereby boost the concentration of oxygen generated by the concentrator. And, for example, when the oxygen concentration exceeds 95.6% oxygen, motor 29 would be energized for minimum r.p.m.'s. The r.p.m. selection of motor 29 is achieved by selecting frequencies that correspond to the predetermined r.p.m. range. Once again, the motor means may comprise an A.C. motor, or perhaps a linear style motor, as previously reviewed.

There is a continous monitoring by oxygen concentration indicator 3 of sampling of the gas mixture generated by the oxygen concentrator. The combination of the frequency generator 26, MOSFET arrangement 27, and wire 28 combine to adjust the speed of motor 29 in response to the concentration of oxygen in sample G. Wire 28 connects with the motor winding tap L1, while the opposite end of the winding is contacted by the tap L2. Therefore, there is a mechanism to keep the oxygen enriched air at a near constant desired concentration for the user.

Those skilled in the art will recognize that modifications of the present invention can be made within the scope of the invention. For example, a wider range of frequencies could be used to provide a more precise control of the motor and thus the oxygen concentrations. Additionally, for example, it may be desirable, due to cost constraints, to use only two frequency outputs, thus effectively controlling the motor at two speeds.

It might also be commented at this time, that rather than utilizing the OCI board as developed by Puritan-Bennett Corporation, and as set forth at 3 in FIGS. 1 through 3 of the drawings, that it is possible that other forms of oxygen sensing means, for detecting the purity of oxygen being generated, could also be used to provide for the inputs to the circuit line 13, or other inputs to the frequency generators 9, 22, and 26, and such oxygen sensing means are available from Companies such as Fujikura, of Japan. The Fujikura device is marketed as an oxygen sensor unit (FCX-UW), and is a limiting current method using zirconia solid electrolyte as the means for measuring the concentration of oxygen created by the oxygen concentrator. In addition, other examples of oxygen sensing technologies and sensing means that could be utilized in conjunction with this invention are described in a publication entitled *The Measurement of Oxygen in Gas Mixtures*, by R. Kocache, which publication is available from the Institute of Physics, under Publication No. 0022-3735/86/060401+12. Said publication is incorporated herein by reference.

Figure 4:
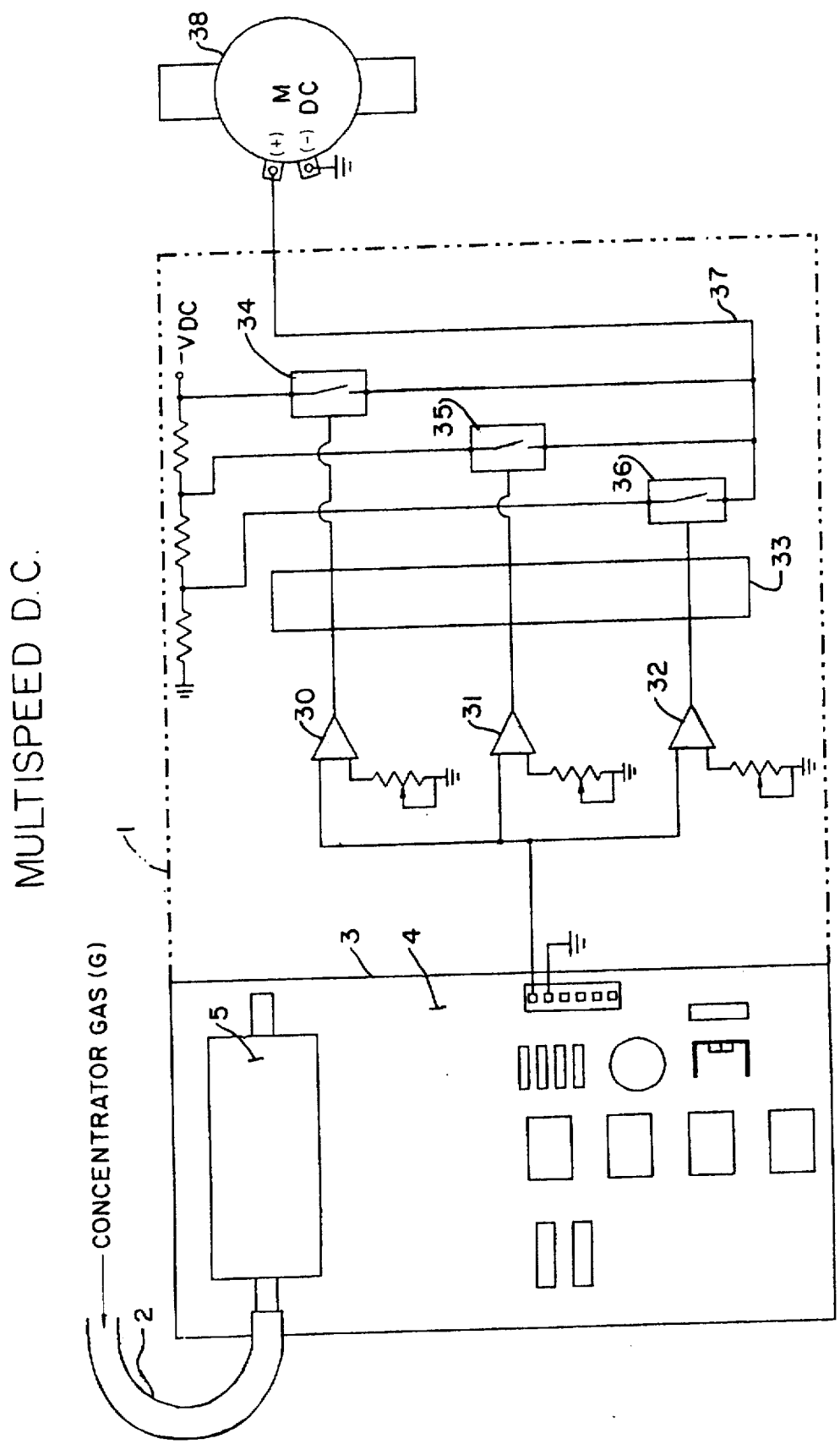
FIG. 4 is a partial schematic, partial diagrammatic view of the apparatus and method of the present invention employing multispeed D.C. means for controlling the operation of an oxygen concentrator.

The apparatus for controlling the concentration of oxygen from an oxygen concentrator using multispeed D.C. means is shown generally schematically and diagrammatically as reference numeral 1 in FIG. 4.

A gas sample inlet port 2 consisting of a tube or fitting or other appropriate means is operatively connected to and leads from an oxygen concentrator flows into device 1 and is shown generally at 3 which is comprised of a conventional pre-printed circuit board 4 and an oxygen sensor 5. The oxygen concentration indicator assembly is available from Nellcor Puritan Bennett Corp., #C-492744-66.

The oxygen sensor 5 is an ultrasonic gas measuring device of the type as described in U.S. Pat. No. 5,060,514, which is owned by the common assignee of this application, the disclosure of which is herein incorporated by reference. Printed circuit board 4 integrates the oxygen content of sample G as determined by sensor 5 and converts the concentration to an electrical output ranging from 0 to 1 volt D.C. which corresponds to 1 to 100 percent oxygen.

Oxygen concentrator indicator 3 is electronically connected to three set-point amplifiers, shown as amplifier 30, 31 and 32 in FIG. 4. The set-point amplifiers are voltage comparators available from National Semiconductor, #LM393. Although the preferred embodiment employs three such set-point amplifiers, it should be noted that any number greater than one may be used. Set-point amplifiers 30, 31, and 32 are electronically connected to three relay mechanisms 34, 35 and 36. Although three relay mechanisms are employed in the preferred embodiment, it should be noted that there may be any number greater than one corresponding to the number of set-point amplifiers employed. Relay mechanisms may consist of mechanical relays, commonly available from Aromat, #JRIaF-DC24V, or various electronic switching means commonly available, such as solid state switching relays from Crydom Corp., USA. Relays 34, 35 and 36 are electronically connected to a D.C. motor 38, at various positions of its windings, disposed within the concentrator and electronically energized through lead 37 so as to drive the concentrator to increase or decrease the amount of supra-atmospheric air supplied to the molecular sieve within the concentrator. A custom multi-tap (tap numbering greater than one) to be manufactured within the scope of this invention by those skilled in the art.

Each of the relays 34, 35 and 36 are operatively connected to a voltage divider network 39. The voltage divider network 39 serves to provide various voltage levels which are in turn used to drive motor 38 at different pre-programmed r.p.m.'s, or speeds.

In operation, a sample of gas G enters into port 2 and is analyzed by sensor 5 of the oxygen concentration indicator 3. Pre-printed circuit board 4 converts the concentration of oxygen as detected by sensor 5 to a voltage ranging from 0 to 1 volt D.C. corresponding to 0 to 100 percent oxygen in the sample. This voltage is fed to the set-point amplifiers 30, 31, and 32 which are readjusted to respond to various predetermined oxygen concentrations. For example, when the oxygen concentration of sample G drops below a predetermined level, for example, 90% oxygen, motor 38 would be energized for maximum revolutions per minute (r.p.m.'s) and thereby boost the concentration of oxygen generated by the concentrator. And, for example, amplifier 32 could be set to maintain a minimal rate of r.p.m.'s to provide a minimal output from motor 38 if the detected oxygen concentration exceeds a high range, for example, something equal to or greater than 90%. The r.p.m. selection of motor 38 is achieved by taps on the voltage divider network 39. Or, the outputs from the relays 34 through 36, as processed by the voltage divider network 39, could also be used to drive, and maintain a level of operation.

Pre-programmed logic block 33 functions to analyze the output from the set-point amplifiers 30, 31, and 32 before that output is fed to relays 34, 35 and 36 so as to insure that only one of the relays is energized at any given time, thus preventing a potential problem that would result if two or more relays were energized at the same time. Logic block 33 may also contain time delays in order to accommodate some small fluctuations in the oxygen concentration in sample G that do not warrant a change in the oxygen concentrations and thus do not warrant a change in the speed of motor 38. The logic block 33 consists of CMOS technology integrated circuits commonly available from National Semiconductor such as, #CD4001 and timer integrated circuits commonly available from National Semiconductor, #LM555.

Relays 30, 31, and 32 energize motor 38 be selecting individual taps on the voltage divider network 39 by stepping up the low voltage outputs from logic block 33 to the D.C. motor higher voltage requirements.

There is a continuous monitoring by oxygen concentration indicator 3 of sampling of the gas mixture generated by the oxygen concentator. The combination of the set-point amplifiers 30, 31, and 32, logic block 33, relays 34, 35, and 36 voltage divider network 39, combine to adjust the speed of motor 38 in response to the concentration of oxygen in sample G. Therefore, there is a mechanism to keep the oxygen enriched air at a near constant desired concentration for the user.

Those skilled in the art will recognize that modifications of the present invention can be made within the scope of the invention. For example, although the invention has three set-point amplifiers and three relay mechanisms and three voltage taps employed in the preferred embodiment, there may be a greater number of set-point amplifiers and corresponding relays and taps which would allow for wider variation in the incremental changes in the motor r.p.m.'s. For example, a greater number of set-point amplifiers and corresponding relays and taps would allow for smaller incremental increases in motor r.p.m.'s. Additionally, different methods of obtaining preset voltage levels may be employed inlieu of the voltage divider network. For example, transformer taps may be employed producing an A.C. voltage then rectified into preselected D.C. voltage levels at any greater number than one.

Figure 5:
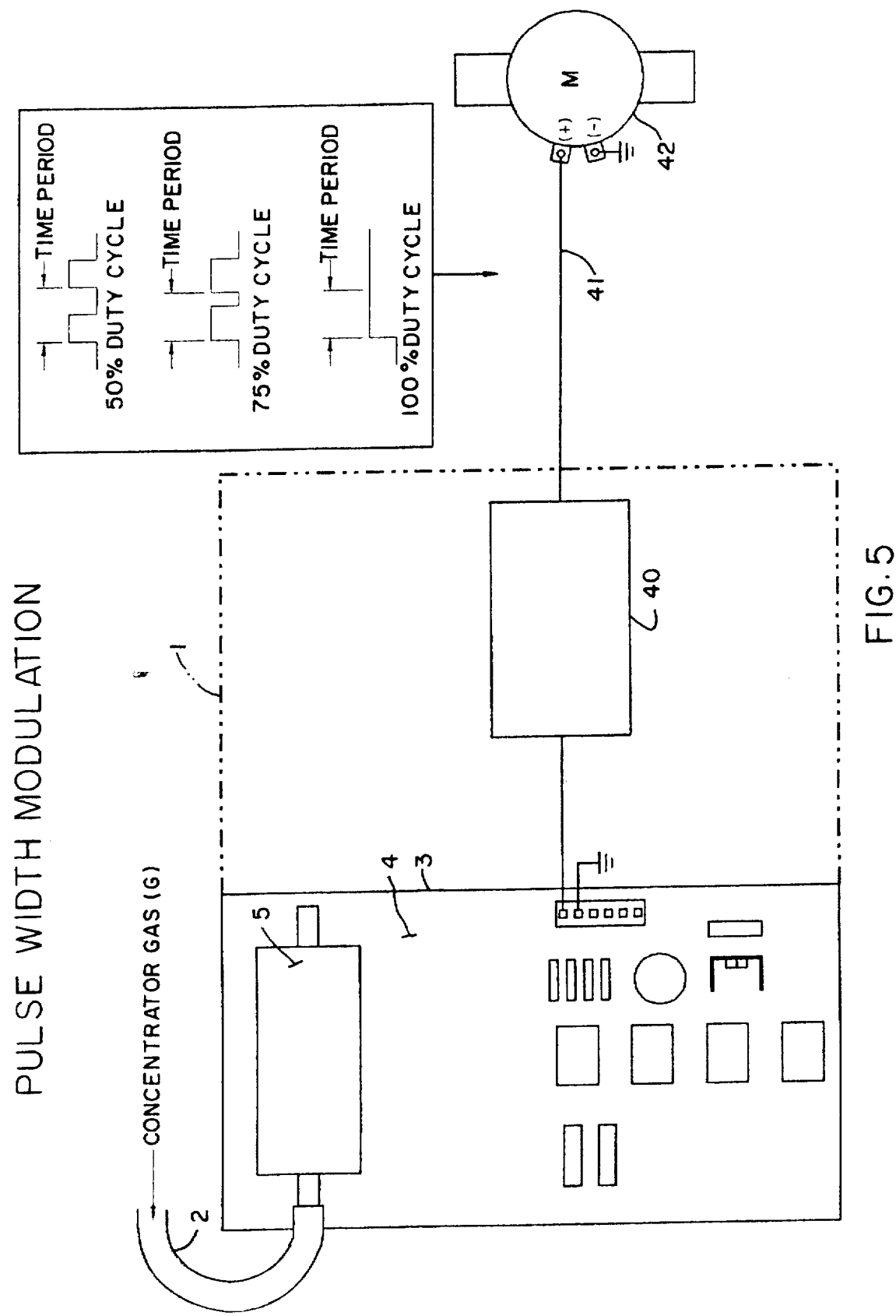
FIG. 5 is a partial schematic, partial diagrammatic view of the apparatus and method of the present invention employing pulse width modulation means for controlling the operation of an oxygen concentrator.

The apparatus for controlling the concentration of oxygen from an oxygen concentrator using pulse width modulation means is shown generally schematically and diagrammatically as reference numeral 1 in FIG. 5.

A gas sample inlet port 2 consisting of a tube or fitting or other appropriate means, is operatively connected to and leads from an oxygen concentrator, flows into device 1 and is shown generally at 3 which is comprised of a conventional pre-printed circuit board 4 and oxygen sensor 5. The oxygen concentration indicator assembly is available from Nellcor Puritan Bennett Corporation, #C-492744-66.

The oxygen sensor 5 is an ultrasonic gas measuring device of the type as described in U.S. Pat. No. 5,060,514, which is owned by the common assignee of this application, the disclosure of which is herein incorporated by reference. Printed circuit board 4 integrates the oxygen content of sample G as determined by sensor 5 and converts the concentration to an electrical output ranging from 0 to 1 volt D.C. which corresponds to 0 to 100 percent oxygen.

Oxygen concentrator indicator 3 is electronically connected to the Pulse Width Modulation (PWM) motor speed control 40 in FIG. 5. The PWM motor speed control 40 is made up of circuitry commonly available from National Semiconductor, #LM555. The PWM motor speed control 40 receives the predetermined calibration output from the oxygen concentration indicator 3 to provide a corresponding duty cycle variable, or pulse width modulated output. For example, the D.C. output from the PWM motor speed control 40 may be modulated at a 50% duty cycle for a corresponding oxygen output from the oxygen concentration indicator 3 of 95.6% oxygen, and conversely oxygen level of 80% oxygen may produce a 100% duty cycle or straight D.C. output. The PWM motor speed control 40 output travels along wires 41 to D.C. motor 42. The D.C. motor 42 is commonly available such as, #OWOSSO, Model #PF2800Q from Motor Products. The motor 42 operates such that the r.p.m. of the motor is a function of the D.C. drive voltage, for example, a low D.C. drive voltage along wire 41 will yield a low r.p.m., or speed and likewise, a higher D.C. drive voltage along wire 41 will yield a higher r.p.m., or speed.

In operation, a sample of gas G enters into port 2 and is analyzed by sensor 5 of the oxygen concentration indicator 3. Pre-printed circuit board 4 converts the concentration of oxygen as detected by sensor 5 to a voltage ranging from 0 to 1 volt D.C. corresponding to 0 to 100 percent oxygen in the sample. This voltage is fed to the PWM motor speed control 40 which is preadjusted to respond to various predetermined oxygen concentrations. For example, when the oxygen concentration of sample G drops below a predetermined level, for example, 80% oxygen, motor 42 would be energized for maximum revolutions per minute (r.p.m.'s) and thereby boost the concentration of oxygen generated by the concentrator. And, for example, when the oxygen concentration exceeds 95.6% oxygen, motor 42 would be energized for minimum r.p.m.'s. The r.p.m. selection of motor 42 is achieved by selecting D.C. voltages that correspond to the predetermined r.p.m. The D.C. voltages are a function of the duty cycle output of PWM motor speed control 40 which is controlled by the voltage output of the oxygen concentraion indicator 3 which is determined by the sample gas G in the gas sensor 5.

There is a continuous monitoring by oxygen concentration indicator 3 by sampling of the gas mixture generated by the oxygen concentrator. The combination of the PWM motor speed control 40, and wire 41 combine to adjust the speed of motor 42 in response to the concentraton of oxygen in sample G. Therefore, there is a mechanism to keep the oxygen enriched air at a near constant desired concentration for the user.

Those skilled in the art will recognize that modifications of the present invention can be made within the scope of the invention. For example, the duty cycle can be more precisely controlled with higher modulation frequencies to provide a more precise control of the motor and thus the oxygen concentrations. Likewise, brushed or brushless D.C. motors could be used within the scope of this invention to provide lower cost alternatives (brushed) or more reliable alternatives (brushless). Furthermore, "Off-the Shelf" D.C. motor speed controllers using variable D.C. output in response to a voltage or current input could be used for control of the motor.

The apparatus for controlling the concentration of oxygen from an oxygen concentrator using flow position control means is shown generally schematically and diagrammatically in FIG. 6.

A gas sample inlet 43 consisting of tube or fitting or other appropriate means is operatively connected to a flow meter 44. Concentrator gas G flows through the gas sample inlet port 43 and into flowmeter 44 and exhausts from flowmeter 44 into the outlet port 45 consisting of a tube or fitting or other appropriate means and supplies concentrator gas G to the patient. Flowmeter 44 is typically made of clear plastic material and is common in the art. For example, a flowmeter is commonly available from Key Instruments, #F043. Flow of concentrator gas G through flowmeter causes the flow ball 46 to rise or fall to a location which is indicative of concentrator gas flow. For example, concentrator gas flow of three liters per minute would cause the flow ball 46 to locate in a position in the flowmeter 44 such that a patient or user could see that the ball was aligned with external marking which indicate three liters per minute. Flowmeter 44 such as that available from Key Instruments, #F043, may be modified to allow the insertion of infrared or infrared light transmitter 47 and infrared detectors 48 spaced vertically along the length of travel of flow ball 46 and inserted such that the infrared light transmitter 47 emits an infrared light beam 49 to an associated infrared detector 48. Whereas, the infrared light beam 49 travels perpendicular to the line of travel of the flow ball 46 there is an individual infrared light transmitter 47 associated with each individual infrared detector 48. When there is concentrator gas flow which causes the flow ball 46 to indicate flow one or more of the infrared light beams 49 becomes blocked by the flow ball 46 causing a loss of infrared light beam 49 detection at the associated infrared detector 48 or associated infrared detectors as the case may be.

The infrared driver circuit 50 supplies the power to drive the infrared light transmitter 47. The infrared logic circuit 51 contains a series of voltage comparator such as #LM393, commonly available from National Semiconductor. The infrared detector 48 in cooperation with voltage comparators sense the presence or absence of the infrared light beam 49. The resulting signal logic circuitry contained within the infrared logic circuitry 51 using components such as CD4001, commonly available from National Semiconductor, make the determination and produce the resultant output that is necessary to effect the r.p.m. of a motor 52 with the use of various motor control methods 53 as discussed previously in the preferred embodiment of this invention. The infrared sensing driver circuits, as at 50, includes both a voltage lead and current limiting resistors, to bias the infrared light transmitters 47, and as can be seen, these components are in series with each other. The infrared logic circuit 51 includes and incorporates a series of setpoint comparators, or standard logic gates, to regulate the voltage at the motor 52. Once again, the motor 52 could comprise either an AC motor, as stated, or even a linear type of motor means. It must be stated that the flow meter as described in this FIG. 6 may be used in lieu of the type of ultrasonic gas measuring device as previously described at 5, in FIGS. 1 through 5 of this application. In addition, the motor control means 53, as shown in FIG. 6, may comprise the various types of amplifiers 6 through 8, etc., the logic block 9, etc., and the various relays 10 through 12, as previously described collectively in FIGS. 1 through 5.

In operation, concentrator gas G enters a flowmeter 44 through the gas sample inlet port 43 which produces an indication of flow which in turn develops an output from the infrared logic circuit 51 which is used to drive various motor control method 53 to effect a change in the r.p.m., or speed, of a motor 52 in response to a change in flow as indicated by flow ball 46.

Those skilled in the art will recognize that modifications of the present invention can be made within the scope of the invention. For example, the resolution and flow accuracy of the flow indication is a function of the number and placement of the infrared transmitters and infrared detectors and, additionally, the total length of travel of the flow ball effects resolution and accuracy and is a result of the flow meter design. A longer travel and a greater number of infrared transmitters and infrared detectors would yield more resolution and higher accuracy. Additionally, for example, the infrared detector logic circuit could provide digital or analog outputs to adapt to various control methods. For example, a 0 to 1 voltage output could be electronically scaled to apply the multispeed A.C. means of operation or perhaps scaled to apply the pulse width modulaton means of operation.

The apparatus for controlling the concentration of oxygen from an oxygen concentrator using flow sensor control means is shown generally schematically and diagrammatically in FIG. 7.

A gas sample inlet port 54 consisting of a tube or fitting or other appropriate means is operatively connected to and leads from an oxygen concentrator flows into a flow sensor 55. The gas sensor outlet port 56 consisting of a tube or fitting or other appropriate means is operatively connected to the flow sensor and provides a means to supply concentrator gas G from flow sensor 55 to the patient or user. The flow sensor 55 used in this invention is available from MicroSwitch, Div. of Honeywell, #AWM46300V. Other flow sensors available from Microswitch include X99797-Aw and AWM3300V. The flow sensor 55 produces a voltage output of 0.5 to 4.5 volts D.C. in response to patient liter flows of concentrator gas G from zero to six liters per minute. The output of the flow sensor is fed into operational amplifier 57 which is commonly available from Motorola, #LM324. The operational amplifier 57 serves to scale the flow sensor 55 electrical input to a voltage range that would coincide with the required various motor control methods 58 which in turn drives the motor 59 to a predetermined r.p.m., or speed. The motor control means as previously described in FIGS. 1 through 5 of this application may be employed herein.

The motor control means 58, as shown herein, is very similar to the motor control means 53, as just explained, and which operates in a similar manner.

In operation concentrator gas G flows into the gas inlet port 54 into the flow sensor 55 and exits the flow sensor 55 into and through the gas sample outlet port 56 to provide an electrical indication of the flow at the flow sensor and providing the electrical output into operational amplifier 57 which produces a proportional drive voltage to operate various motor control methods 58 and provide a resulting r.p.m., or speed, at motor 59 in response to the flow of concentrator gas G measured at flow sensor 55. The r.p.m. of the motor 59 thus becomes a function of the flow measured at the flow sensor 55.

Since it is possible with an oxygen concentrator to predict the amount of oxygen enriched air generated as a result of the amount of flow to a patient, then it is possible to create a curve or requirement of flow of concentrator gas G to the patient versus the motor r.p.m. required to maintain an acceptable level of oxygen enriched air for a patient. For example, if a flow of one liter per minute requires 1000 r.p.m.'s to generate an acceptable concentrator gas purity of greater than 90% oxygen, then the flow sensor 55 in conjunction with operational amplifier 57 and the various control method 58 would provide the drive necessary to produce 1000 r.p.m.'s at a motor 59. And for example, if 1700 r.p.m.'s are required to maintain an oxygen level above 90% oxygen with a flow of concentrator gas G to flow, sensor 55 of five liters per minute, then the flow sensor 55 in conjunction with the operational amplifier 57 and the various control method 58 would drive motor 59 to produce a speed of 1700 r.p.m.'s.

Those skilled in the art will recognize that modifications of the present invention can be made within the scope of the invention. For example, although the invention uses an operational amplifier in the preferred embodiment, it may be desired, depending on application, to produce an output of varying frequencies in proportion to the flow indication that could be used in the variable frequency means of operation.

Figure 8:
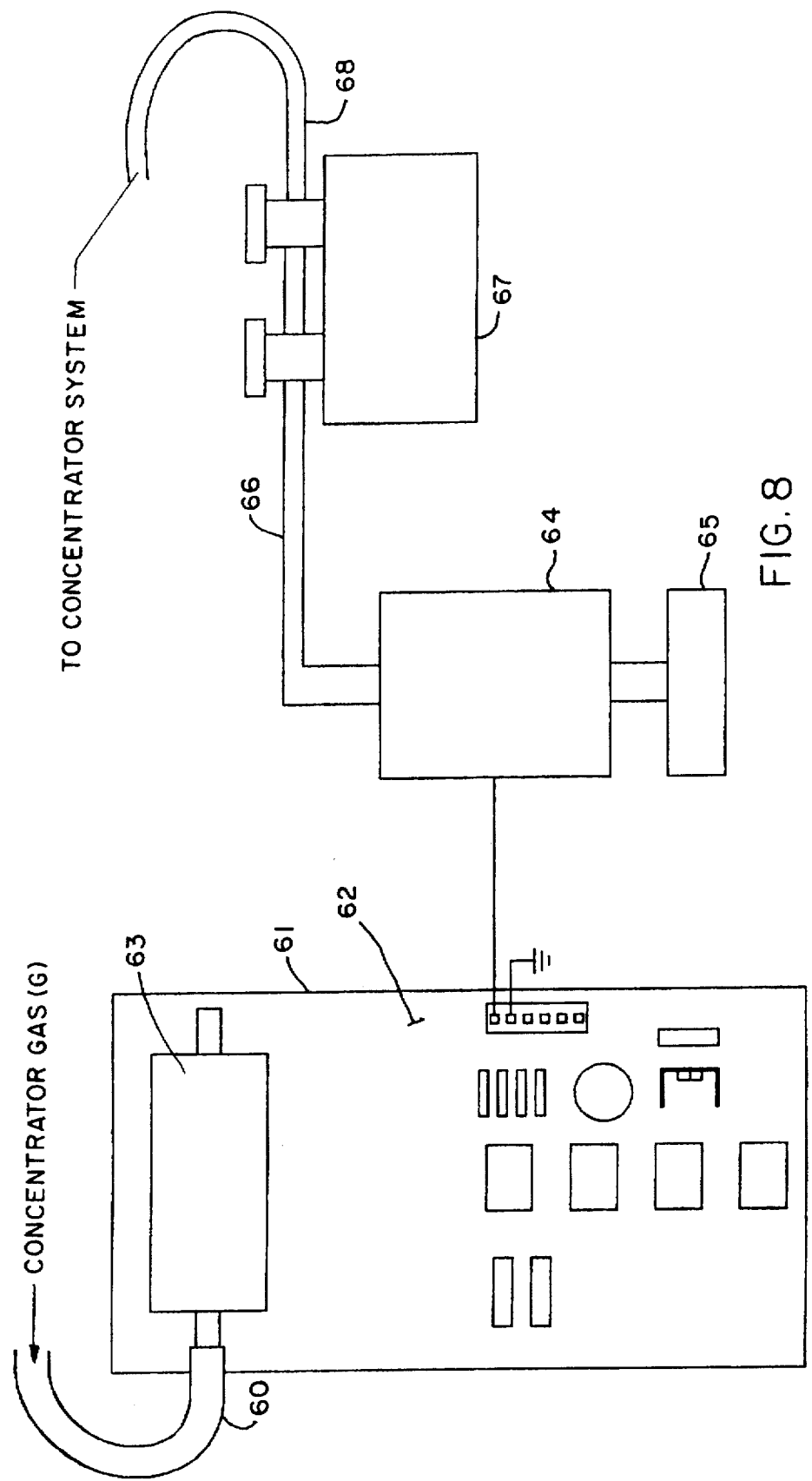
FIG. 8 is a partial schematic, partial diagrammatic view of the apparatus and method of the present invention using intake control means for controlling the operation of an oxygen concentrator.

The apparatus for controlling the concentration of oxygen from an oxygen concentrator using intake control means is shown generally schematically and diagrammatically in FIG. 8. A gas sample inlet port 60 consisting of a tube, or fitting, or other appropriate means is operatively connected to and leads from an oxygen concentrator, flows into the oxygen concentration indicator assembly 61, which is comprised of a conventional pre-printed circuit board 62, and oxygen sensor 63. The oxygen concentration indicator assembly 61 is available from Nellcor Puritan Bennett Incorporated, under Model No. 492744. Other sensors, as identified in the aforesaid publication entitled *The Measurement of Oxygen and Gas Mixtures*, in addition to the oxygen sensing means available from Fujikura, supra, are available. The oxygen sensor 63 is an ultrasonic gas measuring device of the type as described in U.S. Pat. No. 5,060,514, which is owned by the common assignee of this application, the disclosure of which is herein incorporated by reference. Printed circuit board integrates the oxygen content of sample G as determined by sensor 63 and converts the concentration to an electrical output ranging from 0 to 1 volt D.C. which corresponds to 0 to 100 percent oxygen. Oxygen concentration indicator 61 is electronically connected to variable intake restriction 64, which is commonly available from Honeywell, #BP2EV0006. The air intake 65 is pneumatically connected to the variable intake restriction 64 which is pneumatically connected to the compressor air intake port 66 and into compressor 67. The compressed air outlet port 68 is pneumatically connected to the concentrator system, in this case the molecular sieve beds. The compressor 67 can be any pneumatic compressor used in the art.

In operation, concentrator gas G enters into the gas sample inlet port 60 which provides a sampling of the oxygen enriched concentrator gas G at oxygen sensor 63. The resulting electrical signal which is a function of the purity of concentrator gas G. Concentrator gas G is analyzed by oxygen concentration indicator 61 and the resultant voltage output is electronically input into the variable intake restriction 64 which controls, or restricts, the amount of ambient air supplied from air intake 65 into and through variable intake restriction 64 and into the compressor 67 along the compressor air intake port 66. As known in the art, the greater the volume of air allowed to enter into a compressor's compression chamber then the more work that the compressor 67 will experience. For example, for a common prescription of two liters per minute, the variable intake restriction 64 might be controlled by the oxygen concentration indicator 61 to a level of restriction of 50% opening, or air volume intake, at variable intake restriction 64. A prescription of four liters per minute, might provide a variable intake restriction level of 75% open at variable intake restriction 64. For example, if it is determined that the patient requires two liters per minute of concentrator gas at a purity level greater than or equal to 90% oxygen, then the oxygen concentration indicator 61 would control via the electronic output the variable intake restriction to provide oxygen to the patient at levels greater than or equal to 90% oxygen. The resultant restriction at variable intake restriction 64 results in less air being allowed to enter into the compressor, thus allowing for less work on the part of compressor 67 an increase in efficiency resulting in lower operating cost for the patient. Conversely, the same concentrator could be used by a patient requiring a prescription of four liters per minute of oxygen at a level greater than or equal to 90% oxygen, whereas the oxygen concentration indicator 61 would control the variable intake restriction 64 to allow a greater intake of atmospheric air to enter the compressor and provide the necessary volumes of compressor air to concentration system which would result in meeting the requirement of four liters per minute prescription.

Currently, a concentrator capable of producing acceptable levels of oxygen enriched air at five liters per minute are used to supply oxygen enriched air to patients only requiring the more common prescription of two liters per minute of oxygen enriched air which results in electrical and pneumatic inefficiencies whose cost is usually borne by the patient. Effectively, this invention allows the patient only to pay for the oxygen that they use.

Those skilled in the art will recognize that modifications of the present invention can be made within the scope of the invention. For example, although the invention uses a variable intake restriction, it is possible to use a number of set-point adjustable restrictions pneumatically connected in parallel which may be a more cost effective means in some applications. Or for example, within the scope of the invention, a flow sensor means could be used in lieu of oxygen concentration indicator means to provide different levels of intake retriction.

The apparatus for controlling the concentration of oxygen from an oxygen concentrator using bleed air control means is shown generally schematically and diagrammatically in FIG. 9. A gas sample inlet port 69 consisting of a tube, or fitting or other appropriate means, is operatively connected to and leads from an oxygen concentrator, flows into the oxygen concentration indicator 70 assembly which is comprised of a conventional pre-printed circuit board 71 and oxygen sensor 72. The oxygen concentration indicator 70 assembly is available from Nellcor Puritan Bennett Incorporated, Model No. 492744.

The oxygen sensor 72 is an ultrasonic gas measuring device of the type as described in U.S. Pat. No. 5,060,514, which is owned by the common assignee of this application, the disclosure of which is herein incorporated by reference. Pre-printed circuit board 71 integrates the oxygen content of sample G as determined by sensor 72 and converts the concentration to an electrical ouput ranging from 0 to 1 volt D.C. which corresponds to 0 to 100 percent oxygen. Oxygen concentration indicator 70 is electonically connected to the bleed valve 73 which is commonly available from Honeywell, #BPE2EV0006. The air intake 74 is pneumatically connected to the bleed valve 73 which is pneumatically connected to the compressor air outlet port 75 from the compressor 76. The compressed air outlet port 75 is pneumatically connected to the concentrator system, in this case the molecular sieve beds. The compressor 76 can be any pneumatic compressor used in the art.

In operation concentrator gas G enters into the gas sample inlet port 69 which provides a sampling of the oxygen enriched concentrator gas G at the oxygen sensor 72. The resulting electrical signal is a function of the purity of concentrator gas G. Concentrator gas G is analyzed by oxygen concentration indicator 70 and the resultant voltage output is electronically input into the bleed valve 73 which controls, or bleeds, an amount compressed from the compressor 76 at the compressed air outlet port 75. As known in the art, the greater the amount of back pressures at the outlet of the compressor 76, the more work that the compressor 76 will experience. For example, for a common prescription of two liters per minute, the bleed valve 73 might be controlled by the oxygen concentration indicator 70 to a level of bleed of 50% opening, or air volume exhaust, at the bleed valve 73 to atmosphere. A prescription of four liters per minute might provide a bleed opening level of 25% opening, or bleeding, at the bleed valve 73. For example, if it is determined that the patient requires two liters per minute of concentrator gas at a purity level greater than or equal to 90% oxygen, then the oxygen concentration indicator 70 would control via the electronic output, the bleed valve opening to provide oxygen to the patient at levels greater than or equal to 90% oxygen. The resultant bleed at variable bleed valve 73 results in less back pressure at the compressor outlet port 75, thus allowing for less work on the part of compressor 76 and an increase in efficiency resulting in lower operating cost for the patient.

Conversely, the same concentrator could be used by a patient requiring a prescription of four liters per minute of oxygen at a level greater than or equal to 90% oxygen, whereas the oxygen concentration indicator 70 would control the bleed valve 73 to allow a lesser bleed of compressed air to atmosphere which would result in meeting the requirement of the four liters per minute prescription.

Currently, a concentrator capable of producing acceptable levels of oxygen enriched air at five liters per minute are used to supply oxygen enriched air to patients only requiring the more common prescription of two liters per minute of oxygen enriched air which results in electrical and pneumatic inefficiencies whose cost is usually borne by the patient. Effectively, this invention allows the patient to only pay for the oxygen that they use.

It will be appreciated that the foregoing feedback mechanisms as described and illustrated in FIGS. 1 through 9 are used with oxygen generators. Those skilled in the art will recognize that the oxygen generators necessarily have motor cooling fans or generator ventilation fans. The foregoing feedback mechanisms also can be employed to control the speed of those fans in response to oxygen concentration. If the oxygen concentration is such that the motor is operating at greater r.p.m.'s, then the feedback mechanism can increase the rate of the ventilating fan to dissipate heat from the motor.

Those skilled in the art will recognize that modifications of the present invention can be made within the scope of this invention. For example, a flow sensor means, within the scope of this invention, could be used in lieu of the oxygen concentration indicator to provide the required amount of bleed at the bleed valve. Additionally, the use of intake control means and the bleed valve means could be used together to provide a more precise control of the compressed air for efficient operation of an oxygen concentrator. Also, the use of a nitrogen sensor in lieu of an oxygen sensor could be used and the electronics calibrated to achieve minimum nitrogen generation and thus maximum oxygen generation. Furthermore, the compressor means does not necessarily have to be restricted to reciprocating type compressors. For example, a linear stroke type compressor means with associated motor means may be utilized, such as that described in the previous application. Whereas the amount of stroke is controlled to provide proportional control over the amount of oxygen produced by an oxygen concentrator. It is also possible to use the feedback means to control the rate of operation, and the amount of amount of oxygen generation, in a ceramic based oxygen concentrator. Such as available from Fujikura, Ltd. corporation, located at Tokyo, Japan. Whereas, control of voltage and/or current applied to the ceramic oxygen generation tubes is varied in response to the feedback means, preferably an oxygen sensor, to provide precise control over the rate of operation of such a device. Furthermore, the type of sensor used to detect the amount of oxygen in the gas sample may also include a zirconium oxide base sensor, a paramagnetic base sensor, a galvanic type of sensor, and the like. Other oxygen sensors are also available, as previously described herein.

Since these and other modifications and changes may be made in the invention without departing from the scope of the inventon, the foregoing description and accompanying illustrations should be viewed as illustrative only and not limiting in a sense.

Having thus described the invention, what is claimed and desired to be secured by Letters Patent is:

1. A method of controlling the concentration of oxygen from an oxygen concentrator driven by a motor, comprising the steps of:

determining the concentration of oxygen in a sample produced by such oxygen concentrator;

converting said oxygen concentration to a low D.C. voltage which corresponds to said oxygen concentration;

conducting said voltage to a plurality of set-point amplifier;

amplifying said voltage;

conducting said voltage as amplified to a logic block;

analyzing said voltage;

determining a rate of operations per minute for said motor base voltage;

energizing one of a plurality of switching means based upon said rate of operations per minute of said motor; and energizing an appropriate control means on the motor through said switching means based upon the rate of operation of said motor per minute.

2. the method of claim 1 wherein said motor comprises an A.C. motor having a plurality of winding taps, and determining the rate of revolutions per minute for such A.C. motor based upon said voltage; and energizing the appropriate winding tap on said A.C. motor through one of said switching means based upon the rate of revolutions per minute of said motor.

3. The method of claim 1 wherein said motor comprises a linear stroke inducing motor, determining the stroke rate of the said linear stroke inducing motor based upon said voltage; and energizing the appropriate control means upon said linear motor through said switching means based upon the stroke rate per minute of said linear motor.

4. The invention of claim 3 wherein providing taps upon said motor, and there are three taps upon said linear stroke inducing motor.

5. The method of claim 1 including analyzing said motor, analyzing said voltage, analyzing the voltage upon the motor, the step of analyzing said motor further including analyzing said voltage to determine a rate of operations per minute for said motor based upon said voltage, and said step of analyzing said motor further includes the step of insuring that only one said swtiching means is energized at a time.

6. The method of claim 1 wherein said step of determining an appropriate rate of operations per minute of the motor further comprises the step of delaying of the determination of energization of one of said switching means so as to accommodate small fluctuations in said oxygen concentration.

7. The method of claim 1 wherein said switching means comprising solid state relays.

8. An apparatus for controlling the concentration of oxygen from an oxygen concentrator employing a compressor motor means comprising:

an oxygen concentration indicator having a pre-printed circuit board and an oxygen sensing means operatively connected to said circuit board for determining a concentration of oxygen in a gas sample;

a plurality of set-point amplifiers operatively connected to said circuit board;

a logic block operatively connected to said plurality of set-point amplifiers;

a plurality of switching means, each one of said switching means being operatively connected to said logic block; and a plurality of control means, each one of said control means operatively connected to one of said switching

19 means for regulating the degree of operation of said motor means.

9. The invention of claim 8 wherein said motor means comprises an A.C. compressor motor means.

10. The invention of claim 9 wherein said circuit board generating a D.C. voltage corresponding to the concentration of oxygen, and said logic block is a preprogrammed logic block capable of selectively relaying said D.C. voltage to one of said plurality of switching means at a time.

11. The invention of claim 8 wherein said motor means is a linear stroke operative motor means.

12. The invention of claims 9 or 11 wherein said circuit board converts said concentrations of oxygen in said gas sample to a D.C. voltage corresponding to said oxygen concentration.

13. The invention of claims 9 or 11 wherein said oxygen sensing means is an ultrasonic gas measuring device capable of detecting the concentration of oxygen in said gas sample.

14. The invention of claim 8 wherein said oxygen sensing means is one of a zirconium oxide base sensor, paramagnetic base sensor, or galvanic type sensor.

15. The apparatus of claim 8 wherein said switching means comprising solid state relays.

16. An apparatus for controlling the concentration of oxygen from an AC motor-driven oxygen concentrator comprising:

a pre-printed circuit board capable of converting an oxygen concentrated to a DC voltage;

an ultrasonic gas measuring device for measuring a concentration of oxygen in a sample of air generated by such oxygen concentrator operatively connected to said circuit board;

a plurality of set point amplifier means operatively connected to said circuit board;

a logic block operatively connected to said plurality of set point amplifier means;

a plurality of switching means, each one of said switching means being operatively connected to said logic block; and a plurality of winding taps located on such AC motor, each one of said winding taps being operatively connected to and capable of energization by one of said plurality of switching means.

17. The apparatus of claim 16 wherein said switching means comprising solid state relays.

18. An apparatus for controlling the concentration of oxygen from an oxygen concentrator comprising:

an AC motor disposed to drive said oxygen concentrator;

a plurality of winding taps on a motor winding of said AC motor capable of limiting the revolutions per minute of said motor;

a plurality of solid state relays, each one of said solid state relays being operatively connected to one of said plurality of motor winding taps;

a logic block operatively connected to said solid state relays, said logic block being capable of energizing one of said plurality of solid state relays at a time so that one of said winding taps is energized at a time;

a plurality of set point amplifiers operatively connected to said logic block;

an oxygen concentrator indicator circuit board operatively connected to said plurality of set point amplifiers, said circuit board capable of converting an oxygen concentration in a sample of air to a DC voltage; and an oxygen concentration sensor operatively connected to said circuit board, said sensor disposed to receive an air sample from such oxygen concentrator and determine a concentration of oxygen in said sample and relaying said concentration to said circuit board.

19. An apparatus for controlling the concentration of oxygen derived from a quantity of air passing through an oxygen concentrator driven by an associated motor comprising:

an oxygen concentrator having a motor control therein, an oxygen sensor measuring device for measuring the concentration by percentage of oxygen in a sample of air generated by said oxygen concentrator operatively connected thereto, regulating the functioning of the concentrator motor to vary the percentage of oxygen being generated by the concentrator, to provide an output of oxygen required for usage by a patient.

20. The invention of claim 19 and including an air intake communicating with the oxygen concentrator, and regulating and controlling the quantity of air taken in and by the oxygen concentrator during its functioning to generate a percentage of oxygen from the air passing through the oxygen concentrator during its functioning.

21. The improvement of claim 19 wherein the oxygen sensor measuring device is an ultrasonic gas measuring device.

22. The improvement of claim 19 wherein said oxygen sensor measuring device is a zirconia solid electrolyte gas measuring device.

23. In an oxygen concentrator having a motor, a motor driven compressor, a motor driven ventilation fan and an absorption means for concentrating oxygen from an outside air flow, the improvement comprising:

a feedback mechanism for controlling the output of the compressor according to a concentration of oxygen in a sample of oxygen enriched air produced by the concentrator.

24. The improvement of claim 23 wherein the feedback mechanism is a multispeed AC mechanism.

25. The improvement of claim 23 wherein the feedback mechanism is a set-point frequency mechanism.

26. The improvement of claim 23 wherein the feedback mechanism is a variable frequency mechanism.

27. The improvement of claim 23 wherein the feedback mechanism is a multispeed DC mechanism.

28. The improvement of claim 23 wherein the feedback mechanism is a pulse width modulation mechanism.

29. The improvement of claim 23 wherein the feedback mechanism is a flow position control mechanism.

30. The improvement of claim 23 wherein the feedback mechanism is a flow sensor control mechanism.

31. The improvement of claim 23 wherein the feedback mechanism is an air intake control mechanism.

32. The improvement of claim 23 wherein the feedback mechanism is a bleed air control mechanism.

33. The improvement of claim 23 wherein the feedback mechanism further controls the output of the ventilation fan.

34. An oxygen concentrator having a motor, a motor driven compressor, a motor driven ventilation fan and an absorption means for concentration of oxygen from an outside air flow, the improvement comprising:

a feedback mechanism for controlling the output of the compressor according to a concentration of oxygen in a sample of oxygen enriched air produced by the concentrator.

35. An apparatus for controlling the concentration of oxygen from an oxygen concentrator comprising:

a linear motor disposed to drive said oxygen concentrator;

a plurality of taps upon the linear motor and capable of limiting the stroke per minute of said motor;

a plurality of switching means, each one of said switching means being operatively connected to one of said plurality of linear motor taps;

a logic block operatively connected to said switching means, said logic block being capable of energizing one of said plurality of switching means at a time so that one of said motor taps is energized at a time;

a plurality of set-point amplifiers operatively connected to said logic block;

an oxygen concentrator indicator circuit board operatively connected to said plurality of set-point amplifiers, said circuit board capable of converting an oxygen concentration in a sample of air to a DC voltage; and an oxygen concentration sensor operatively connected to said circuit board, said sensor disposed to receive an air sample from said oxygen concentrator and determine a concentration of oxygen in said sample and relaying said concentration to said circuit board.

36. The apparatus of claim 35 wherein said switching means comprising solid state relays.

* * * * *